United States Patent [19]

Hendrick

[11] 4,431,028
[45] Feb. 14, 1984

[54] MULTIPLE ORIFICE VALVE WITH LOW VOLUME FLOW CONTROL

[75] Inventor: Fred W. Hendrick, Long Beach, Calif.

[73] Assignee: Smith International, Inc., Newport Beach, Calif.

[21] Appl. No.: 251,394

[22] Filed: Apr. 6, 1981

[51] Int. Cl.$^3$ .................. F16K 47/04; F16K 3/08; F16K 3/32
[52] U.S. Cl. ..................... 137/625.3; 137/625.31; 138/46; 251/208
[58] Field of Search .............. 137/625.31, 625.3; 251/208, 206, 121; 138/46

[56] References Cited

U.S. PATENT DOCUMENTS

| | | | |
|---|---|---|---|
| 150,517 | 5/1874 | Brooks | 137/625.31 |
| 488,228 | 12/1892 | Slyker | 137/625.31 |
| 839,073 | 12/1906 | Miner | 137/625.31 X |
| 2,118,295 | 5/1938 | Crawford et al. | 138/46 X |
| 2,913,006 | 11/1959 | Heymann | 137/625.31 |
| 3,207,181 | 9/1965 | Willis | 137/625.31 |
| 3,331,396 | 7/1967 | Willis | 137/625.31 |
| 3,414,007 | 12/1968 | De Marco | 251/208 X |
| 3,978,888 | 9/1976 | Naono | 137/625.11 X |

Primary Examiner—Arnold Rosenthal
Attorney, Agent, or Firm—Christie, Parker & Hale

[57] ABSTRACT

A multiple orifice flow control valve has a set of similar disks mounted in the body of the valve. A downstream disk is mounted in a fixed position in the valve body and an upstream disk is rotatable in the valve body in concentric face-to-face engagement with the downstream disk. There are two holes in the downstream disk and two holes in the upstream disk for control of the flow of fluids through the valve. The two holes in each disk are at non-adjacent apexes of a regular pentagon. By rotating the upstream disk 72° in one direction the valve changes from closed to one-half open. By rotating the upstream disk through the same angle in the opposite direction, the valve changes from closed to fully open.

15 Claims, 7 Drawing Figures

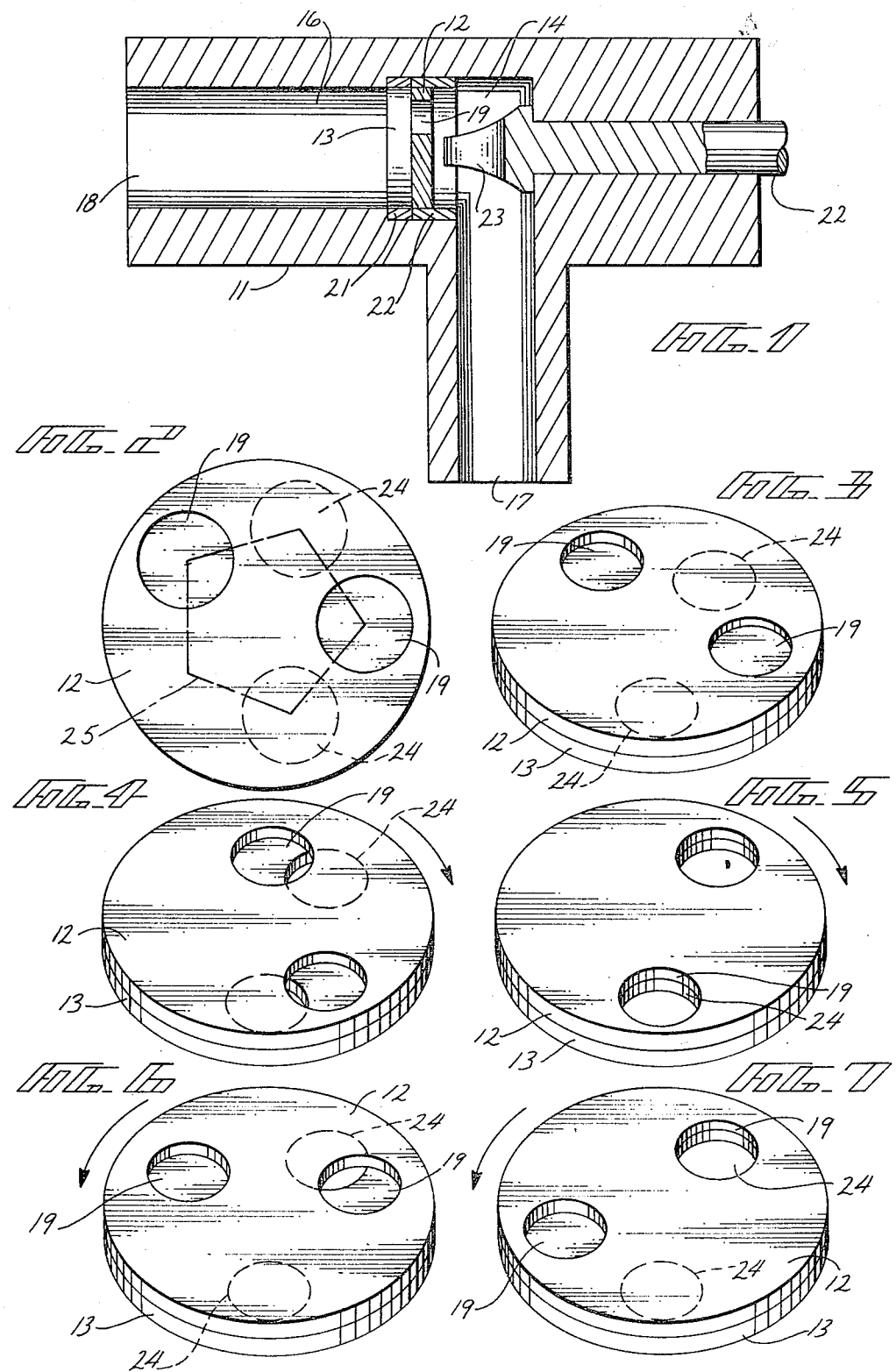

MULTIPLE ORIFICE VALVE WITH LOW VOLUME FLOW CONTROL

FIELD OF THE INVENTION

The present invention relates to a multiple orifice valve comprising a set of disks used for controlling the flow of fluid with improved calibration at low flow rate.

BACKGROUND OF THE INVENTION

Multiple orifice valves are useful for control of flow of fluids such as fluids produced from oil and gas wells and the like. Orifice valves, for example, are used on a wellhead for control of the rate of flow of well production fluids from a well. Such valves are often referred to as chokes. Exemplary multiple orifice valves are described in U.S. Pat. Nos. 3,207,181 and 3,331,396 by R. S. Willis, both of which are incorporated by this reference.

The rate of flow of fluid through an orifice valve is in part determined by the number and size of holes in both a stationary disk and a rotatable disk mounted across a fluid path through a valve body. In an exemplary valve, there are two diametrically opposite holes in each of the upstream and downstream disks. The holes in the rotatable upstream disk are positioned in various degrees of alignment with the holes in the stationary downstream disk by angular movement of the rotatable disk. The rotatable disk can be moved from a fully closed position out of alignment with the holes in the downstream disk for blocking flow through the valve to a fully opened position with the holes aligned for providing maximum flow through the valve.

Such a valve or choke is used for controlling the rate of production from an oil well by rotating the upstream disk to a position at an angle of up to 90° from the closed position. At some position within this range 20%, for example, of the cross-sectional area of each of the holes in the upstream disk overlaps 20% of the area of the holes in the downstream. The balance of each of the holes is occulted by the other disk. When in such a position the flow through the valve is 20% of the flow when the valve is fully open. This percentage and others can be indicated by indicia on the valve stem so that the valve can be set to a desired flow rate.

It is desirable to reliably adjust such a valve to reproducible valve openings. This is difficult at low flow rates, however, since the percentage change in flow is rather large for a small angular displacement of the disk. Reproducible adjustment can therefore be difficult.

Setting of an adjustable choke on an oil or gas well is quite often near the low end of the range of flow through the valve. This occurs because of the conservative design employed in the oil patch. A larger valve than might appear necessary is commonly used at the wellhead so that the valve can be left in place for a long time during the productive life of the well. Such a valve can be set with a small valve opening to obtain a desired production flow during early life of a well when production pressures are high. Thereafter, as production pressure gradually decreases, the valve can be gradually opened for maintaining a desired flow. Such a valve may be used in the low ranges of flow control, that is less than half open, for periods of months or years.

Multiple orifice valves have a notoriously tight calibration range at low flow rates, particularly up to about 20% of maximum flow, and it is desirable to extend the calibration range that can be used reliably and reroducibly.

SUMMARY OF THE INVENTION

There is, therefore, provided in practice of this invention a multiple orifice flow control valve comprising a valve body having a downstream disk fixed in place in the valve body, an upstream disk is concentric with and in face-to-face engagement with the downstream disk. Each disk has a pair of fluid flow holes therethrough wherein each of the holes is located at an apex of a regular polygon having at least five sides concentric with the disks. The pair of holes in each such disk is separated by one imperforate apex of the polygon. By rotating the upstream disk through a selected angle in one direction, the valve moves from closed to fully open. When rotated in the opposite direction through the selected angle, the valve moves from closed to one-half open, thereby doubling the ability to control flow with precision between closed and one-half open.

DRAWINGS

These and other features and advantages of the present invention will be appreciated as the same becomes better understood by reference to the following detailed description when considered in connection with the accompanying drawings wherein:

FIG. 1 is a semi-schematic longitudinal cross-sectional view of a multiple orifice valve of an exemplary embodiment of this invention;

FIG. 2 is a face-on view of a set of disks for the valve in their orientation when the valve is closed;

FIG. 3 is a perspective view of the set of disks when the valve is closed;

FIG. 4 is a perspective view of the set of disks with one disk rotated in one direction to a partially open position;

FIG. 5 is a perspective view of the set of disks rotated further in the same direction to a full open position;

FIG. 6 is a perspective view of the set of disks rotated in the opposite direction to a partially open position; and FIG. 7 is a perspective view of the set of disks rotated further in the second direction to a one-half open position.

DETAILED DESCRIPTION

The multiple orifice valve illustrated semi-schematically comprises a valve body 11 divided by a set of disks 12 and 13 into an upstream chamber 14 and a downstream chamber 16. There is an inlet opening 17 into the upstream chamber for entrance of fluids and an outlet opening 18 from the downstream chamber for fluid egress.

Although not shown in the drawings, suitable means for connecting the valve body to inlet and outlet conduits are provided. These can comprises flanges, threads, or the like at the inlet and outlet of the valve body. Minimal details of the valve are included herein since they are conventional and not needed for an understanding of the invention. Additional details of multiple orifice valves can be found in the above-mentioned U.S. Patents.

The set of disks comprises an upstream disk 12 and a downstream disk 13 which are preferably composed of erosion resistant materials, such as aluminum oxide, tungsten carbide, or the like. Two holes (one of which, 19, is illustrated in the upstream disk in FIG. 1) are provided through each disk at the same radial distance from the center of the disk. When the holes through the disks do not overlap to any degree, that is, when the holes are completely out of alignment with each other, fluid flow from the upstream chamber to the downstream chamber is blocked. When the holes through the disks are at least partly in alignment with each other, that is, when portions of the holes are superimposed, fluid introduced into the upstream chamber through the inlet 17 can flow through holes in the disks into the downstream chamber and exit the valve at the outlet 18. The amount of fluid flow through the valve is controlled by the degree of alignment of the holes.

In an exemplary embodiment, the circular downstream disk 13 is mounted in a fixed position in the valve body across the fluid flow path between the upstream and downstream chambers. The downstream disk is mounted in an annular ring 21 which surrounds the circumference of the disk and is affixed to the disk by epoxy resin or like adhesive, brazing, and/or by other securing means such as pins. The ring in turn is fixed by bolts, pins, or the like to the valve body.

The circular upstream disk 12 is rotatably mounted in the valve body concentric with and in face-to-face engagement with the downstream disk. In the exemplary embodiment each of the disks has about equal radial and axial dimensions, although disks of differing dimensions can be used, if desired.

The upstream disk is mounted in an annular ring 22 which surrounds the circumference of the disk and is affixed thereto by epoxy resin or similar adhesive, brazing, and/or by other securing means such as pins.

The upstream disk can be rotated relative to the downstream disk for superimposing holes in the upstream disk in various degrees of overlap or alignment with holes in the downstream disk. The disks are flat and the facing surfaces are smooth to provide ease of movement of the disks relative to each other and a seal when the valve is closed. In an exemplary embodiment the facing surface of each disk has an eight microinch RMS finish.

A valve stem 22 passes through an opening at one end of the valve body for adjusting the valve. The valve stem is sealed to prevent passage of fluids between the stem and the valve body by O-rings or the like (not shown). A forked turning member 23 is provided on the inner end of the valve stem in the upstream chamber. The two arms or tines of the forked memer 23 engage slots in the upstream face of the annular ring 22 holding the upstream disk. When the valve stem is rotated, the tines engaged in the slots cause rotation of the ring which in turn provides rotation of the upstream disk.

Graduated markings (not shown) can be provided on the valve body and valve stem to indicate the position of the valve as the disk is rotated between its open and closed positions.

FIG. 2 is a face view of the upstream disk 12 atop the downstream disk which is hidden except where seen through two circular holes 19 through the upstream disk. Two holes 24 are also provided through the downstream disk. In this view the upstream disk is in a position where the holes 19 in the upstream disk are not in alignment with the holes 24 in the downstream disk. This represents the closed position for the valve.

The two holes in each of the disks are located at non-adjacent apexes of a regular pentagon 25 indicated by a phantom line in FIG. 2. That is, the holes are all at the same radial distance from the center of the disk and the two holes in each disk are 144° apart. When the valve is in its closed position, the four holes through the two disks are at four of the five apexes of the pentagon 25. The fifth apex of the pentagon has no holes in either disk.

When the upstream disk is rotated in one direction relative to the downstream disk, such as clockwise as illustrated in the perspective views of FIGS. 4 and 5, the two holes 19 in the upstream disk overlap increasing areas of the two holes 24 in te downstream disk as illustrated in FIG. 4. Upon full rotation through 72° in that direction the valve reaches a fully open position as illustrated in FIG. 5 with the two holes in the upstream disk in alignment with the two holes in the downstream disk. This permits maximum flow of fluid through the valve.

When the upstream disk is rotated in the opposite direction, for example, counterclockwise as illustrated in FIGS. 6 and 7, the valve moves from the closed position illustrated in FIGS. 2 and 3 towards a one-half position as illustrated in FIG. 7. In this direction of rotation one of the holes in the upper disk progressively overlaps larger areas of one of the holes in the downstream disk as illustrated in FIG. 6. The other hole in the upstream disk lies opposite an imperforate area on the downstream disk corresponding to the fifth, unoccupied apex of the pentagon. Similarly, the other hole in the downstream disk lies adjacent the imperforate area on the upstream disk corresponding to the fifth, unoccupied apex of the pentagon. When the upstream disk has been rotated 72° from the closed position, it is one-half open.

When the valve is rotated towards this half open position, a given angular displacement of the upstream disk increases the overlap areas of the holes, and hence the flow rate through the valve, only one-half as much as a corresponding angular rotation in the opposite direction where both holes in the upstream disk overlap both holes in the downstream disk. Since a given angular displacement opens the valve only half as much when rotated in this direction, the ability to control the flow through the valve is doubled. This is particularly important when the desired valve setting is up to about 20% of the full flow. Close control of flow at a valve opening of less than 20% has previously been quite difficult. With a set of disks as described herein, flow control at valve openings down to 10% or less is readily obtained.

It might be noted that with the circular holes described and illustrated herein, the total flow through the valve at the fully open position is somewhat less than obtained through a multiple orifice valve where the holes are diametrically opposite. The reason lies in the somewhat smaller area of the holes in this embodiment to assure that adequate area remains between adjacent holes to assure good closure by the valve. Total flow through the valve can be enhanced if desired by employing larger holes having shapes other than round.

Stated in another way, the pair of holes in each disk can be considered to lie in a pair of equiangular sectors of the disk with one intervening imperforate sector between the sectors containing the holes. When the sectors containing holes are aligned with imperforate sectors, the valve is closed. When sectors containing holes are aligned, the valve is open either half way or completely depending on the direction of rotation.

The preferred embodiment of disks for a multiple orifice valve has four holes in two disks with the two holes in each disk being located at non-adjacent apexes of a regular polygon having a minimum of five sides. It should be apparent that variations in this hole location cna be used for providing one range of valve opening by rotation in one direction and another range of valve opening by rotation in the opposite direction. For example, holes could be provided at two alternate apexes of a regular hexagon. Alternatively, holes could be spaced similarly on the two disks where the included angle between radii to the two holes is different from 144°. In any such embodiment the areas of the holes are less than the areas in the preferred embodiment so as to leave an adequate seal area between holes, hence, the maximum flow through the valve is reduced.

Although but one embodiment has been described and illustrated herein, many modifications and variations will be apparent to one skilled in the art. For example, the holes through the disks are illustrated as round. Other hole shapes for modifying the calibration of flow versus disk rotation or for increasing maximum flow can be used. It is therefore to be understood that within the scope of the appended claims, the invention may be practiced otherwise than as specifically described.

What is claimed is:

1. In a multiple orifice flow control valve comprising:
a valve body;
a downstream disk fixed in the valve body;
an upstream disk concentric with and in face-to-face engagement with the downstream disk;
means for rotating the upstream disk;
a single pair of fluid flow holes through the otherwise imperforate downstream disk; and
a single pair of fluid flow holes through the otherwise imperforate upstream disk;
the improvement wherein:
each of said holes is located at an apex of a regular polygon having at least five sides concentric with the disks, the pair of holes through each disk being separated by one imperforate apex of the polygon clockwise from one of the holes and at least two imperforate apexes of the polygon counterclockwise from said hole.

2. In a multiple orifice flow control valve comprising:
a valve body;
a downstream disk fixed in the valve body;
an upstream disk concentric with and in face-to-face engagement with the downstream disk;
means for rotating the upstream disk;
a single pair of fluid flow holes through the downstream disk; and
a single pair of fluid flow holes through the upstream disk;
the improvement wherein:
the pair of holes through each disk is located at non-adjacent apexes of a regular pentagon concentric with the disks whereby rotation of the upstream disk in a first direction from a closed position moves only one hole in the upstream disk into alignment with one hole in the downstream disk and rotation of the upstream disk in the opposite direction moves both holes in the upstream disk into alignment with holes in the downstream disk.

3. In a multiple orifice flow control valve comprising:
a valve body;
a downstream disk fixed in the valve body;
an upstream disk concentric and in face-to-face engagement with the downstream disk;
means for rotating the upstream disk;
a single pair of fluid flow holes through the downstream disk; and
a single pair of fluid flow holes through the upstream disk;
the improvement wherein:
each disk has five 72° radial sectors, the pair of holes through each of such disks being centered in sectors spaced apart from each other by an imperforate sector and at equal radial distances from the center of the disk.

4. In a multiple orifice flow control valve comprising:
a valve body;
a downstream disk fixed in the valve body;
an upstream disk concentric and in face-to-face engagement with the downstream disk;
means for rotating the upstream disk;
a single pair of fluid flow holes through the downstream disk; and
a single pair of fluid flow holes through the upstream disk;
the improvement wherein:
each of the holes is at an equal radial distance from the center of the disks, the smaller angle between radii to the holes on one disk being the same as the smaller angle between radii to the holes on the other disk, such angle being an angle of no more than about 144°, the valve having a closed position in which one of the holes in the upstream disk is in a position approximately bisecting the smaller angle between the holes in the downstream disk.

5. In a multiple orifice flow control valve comprising:
a valve body;
a downstream disk fixed in the valve body;
an upstream disk concentric and in face-to-face engagement with the downstream disk;
means for rotating the upstream disk;
a single pair of fluid flow holes through the downstream disk;
a single pair of fluid flow holes through the upstream disk; and
the improvement wherein:
the valve has a closed position in which none of the holes are in alignment, a fully open position wherein the upstream disk is rotated through a selected angle in one direction relative to the downstream disk and the two pairs of holes are in alignment, and a half open position wherein the upstream disk is rotated through the selected angle in the opposite direction relative to the downstream disk and one hole in the upstream disk is in aligment with one hole in the downstream disk and the other hole in the upstream disk is out of alignment with the other hole in the downsteam disk.

6. In a valve as recited in claim 5 the improvement wherein the selected angle is 72°.

7. In a multiple orifice flow control valve comprising:
a valve body;
a downstream disk fixed in the valve body;
an upstream disk concentric and in face-to-face engagement with the downstream disk;
means for rotating the upstream disk;
a single pair of fluid flow holes through the downstream disk; and
a single pair of fluid flow holes through the upstream disk;

the improvement comprising:

means for aligning both holes in the upstream disk with imperforate portions of the downstream disk when the upstream disk is rotated to a central closed position, aligning both holes in the upstream disk with the holes in the downstream disk when the upstream disk is rotated through a selected angle in one direction, and aligning one hole in the upstream disk with one hole in the downstream disk and the other hole in the upstream disk with an imperforate portion of the downstream disk when the upstream disk is rotated through the selected angle in the opposite direction.

8. In a valve as recited in claim 7 the improvement wherein the selected angle is 72°.

9. A set of disks for installation in a multiple orifice flow control valve wherein each disk comprises:

a single pair of disconnected fluid flow holes through the disk, said disk having no other fluid flow holes therethrough, each of said holes being located at an apex of a regular polygon having at least five sides concentric with the disk, the pair of holes through each disk being separated by one imperforate apex of the polygon in a clockwise direction from one of the holes and by at least two imperforate apexes of the polygon in a counterclockwise direction from said hole.

10. A set of disks for installation in a multiple orifice flow control valve wherein each disk consists of:

a single pair of fluid flow holes through the disk located at non-adjacent apexes of a regular pentagon concentric with the disk, the other apexes being imperforate.

11. A set of similar disks for installation in a multiple orifice flow control valve wherein each disk comprises:

a single pair of disconnected fluid flow holes through the disk at equal radial distances from the center of the disk, the angle between the radii to the holes on one disk being the same as the angle between radii to the holes on the other disk, such angle being about 144°, the disk having no other fluid flow holes.

12. A set of substantially identical disks for installation in a multiple orifice flow control valve comprising:

a single pair of fluid flow holes through each disk arranged so that when the disk are in concentric face-to-face engagement both holes in the first disk are aligned with imperforate portions of the second disk when the first disk is in a central position, both holes in the first disk are aligned with the holes in the second disk when the first disk is rotated through a selected angle in one direction, and one hole in the first disk is aligned with one hole in the second disk and the other hole in the first disk is aligned with an imperforate portion of the second disk when the first disk is rotated through the selected angle in the opposite direction.

13. A set of disks wherein the holes are arranged as recited in claim 12 wherein the selected angle is 72°.

14. A set of similar disks for installation in a multiple orifice flow control valve wherein each disk has five equiangular sectors, three of such sectors being imperforate, and comprising fluid flow holes through the disk in the other two of such sectors spaced apart from each other by one imperforate sector, the holes being at equal radial distances from the centers of the disks.

15. In a valve as recited in claim 7, the improvement wherein in the closed position the pair of holes in the upstream disk straddle one hole in the downstream disk and one of the holes in the upstream disk is between the pair of holes in the downstream disk.

* * * * *